United States Patent [19]
Prince

[11] Patent Number: 5,902,488
[45] Date of Patent: May 11, 1999

[54] SLOW SAND FILTER

[76] Inventor: Dennis Scott Prince, 2036-82 Street, Edmonton, Alberta, Canada, T6K 1Z4

[21] Appl. No.: 08/925,803

[22] Filed: Sep. 9, 1997

[51] Int. Cl.$^6$ .................................................. C02F 1/78
[52] U.S. Cl. ..................... 210/747; 210/758; 210/760; 210/765; 210/792; 210/170; 210/196; 210/272
[58] Field of Search ................................. 210/747, 792, 210/271, 272, 765, 805, 170, 194, 198.1, 758, 106, 242.1, 760, 196

[56]  References Cited

U.S. PATENT DOCUMENTS

| | | | |
|---|---|---|---|
| 4,306,967 | 12/1981 | Trantwein | 210/167 |
| 4,425,144 | 1/1984 | Casperson | 55/96 |
| 4,911,831 | 3/1990 | Davison et al. | 210/86 |
| 5,314,619 | 5/1994 | Runyon | 210/606 |

FOREIGN PATENT DOCUMENTS

| | | |
|---|---|---|
| 109 614 | 10/1907 | Canada . |
| 111 687 | 12/1907 | Canada . |
| 713 386 | 7/1965 | Canada . |
| 2151367 | 6/1994 | Canada . |
| 2151153 | 7/1985 | United Kingdom . |

*Primary Examiner*—Jay H. Woo
*Assistant Examiner*—Frank Lawrence
*Attorney, Agent, or Firm*—Duft, Graziano & Forest, P.C.

[57]  ABSTRACT

A slow sand filter system having a slow sand filter located under water and a scraping mechanism. The scraping mechanism has at least one auger and a shaft, the auger extending across the width of the slow sand filter and being supported in the center thereof by the shaft such that the auger is horizontal. The auger may have a shroud located along the length of the auger and spaced therefrom. The auger moves the schmutzdecke layer across the slow sand filter. The slow sand filter system may have recycle, to permit passing water through the slow sand filter system at a rate less than the maximum vertical flow rate and recycle of a portion of said water passing through the slow sand filter system back to the body of water and removal of the remainder of the water to another location. The method permits operation of the slow sand filter system to provide a variable supply of water without minimal disruption of the filter system.

27 Claims, 7 Drawing Sheets

SLOW SAND FILTER

The present invention relates to a slow sand filter and especially use thereof in the filtration of water e.g. filtration of water intended for use as drinking water. The invention particularly relates to a slow sand filter that may be treated to remove the top layer of the filter, the so-called "schmutzdecke", without removal of the slow sand filter from use or draining water therefrom. In particular embodiments, the filter is capable of being installed under significant depths of water e.g. at the bottom of a lake or pond, from which water would be drawn, and normally chlorinated before being fed to a municipal water system. Such use may include recycle of a portion of the water passing through the slow sand filter.

Slow sand filtration is one of the oldest water treatment processes. It involves drawing water through a sand bed at a low rate, for instance about 0.2 m/hour vertical velocity. A biologically active layer called a schmutzdecke is formed on the surface of the slow sand filter and provides excellent removal of micro-organisms and particulate matter, and effects a reduction in soluble organic material.

At the end of a filtration period, typically about 30 days, the schmutzdecke becomes plugged and the headloss or pressure differential across it becomes too great for continued operation of the slow sand filter. Moreover continued operation may result in negative pressures within the filter, which are undesirable due to a tendency for gas bubbles to come out of solution and interfere with filter operation. In practice, the schmutzdecke is scraped off of the slow sand filter, typically by dewatering the filter and removing the top layer of the filter with mechanical equipment.

Systems are known for the removal of the schmutzdecke without dewatering and taking the filter out of service. This is advantageous in that it eliminates the need for duplicate filter system capacity during cleaning of the schmutzdecke from the filter. One such system uses a barge floating on the water, with a mechanical arm that extends down to the filter bed. The arm holds a shroud having a large screw conveyer or auger in it e.g. with a diameter of 20 cm, that draws the schmutzdecke towards the centre of the shroud, from where it is pumped to the shore for storage. The removed layer is subsequently cleaned and returned to the filter at some later date. The barge traverses the filter by being guided by a wire anchored to opposite sides of the filter basin. The depth of the shroud is adjusted by the mechanical arm, by use of a laser beam transmitted from the shore.

Another system traverses the filter on rails that span the filter and move up and down its length. A shroud is held at the required height, suspended from the rails. The schmutzdecke is agitated within the shroud by a vibrator or rotating drum. The dirty water in the shroud is drawn off. In this system, the sand is not removed but rather is cleaned in place.

None of the above systems are capable or practical for operation in significant depths of water e.g. depths of at least 20 feet or more, and none can operate without a shore or land to control its location. A system that could do so would have value, as it could be placed in the bottom of a lake. This could be particularly advantageous for use in areas where the ground is not very suitable for installation of treatment ponds, for reasons of either cost or the nature of the terrain but where there are lakes. An example of such an area is a large part of Canada, especially northern sections of Canada including northern Alberta. Another advantage would be savings in cost resulting from absence of a need to construct a containment.

A sand filter system has now been found which is capable of being cleaned under water and while in use, especially under significant depths of water and away from shore, and may which utilize partial recycle of water passing through the filter.

Accordingly, one aspect of the present invention provides a slow sand filter system comprising:

a slow sand filter located under water, a scraping mechanism comprising at least one auger and a shaft, said auger extending across the width of the slow sand filter and being supported in the centre thereof by said shaft such that the auger is horizontal, said auger having a shroud located along the length of the auger and spaced therefrom, and means to rotate the auger so as to move a portion of a schmutzdecke layer across the slow sand filter.

In a preferred embodiment of the slow sand filter system of the present invention, rotation of the auger effects movement of the auger over the slow sand filter.

In yet another embodiment, the apparatus has means to rotate the auger and means to move the auger over the slow sand filter.

In a still further embodiment, the auger is adapted to move schmutzdecke towards said shaft, said scraping mechanism additionally having means to remove schmutzdecke from the centre of the slow sand filter.

In another embodiment, the auger is adapted to move schmutzdecke away from the shaft.

In a preferred embodiment of the slow sand filter of the present invention, an auger screw is located across the width of the slow sand filter and supported in the centre thereof, such that the auger is horizontal, said auger screw having a shroud located along the length of the auger and spaced therefrom, and means to rotate the auger so as to move a portion of the layer of schmutzdecke towards the centre of the slow sand filter and means to remove schmutzdecke from the centre of the slow sand filter.

In a further embodiment, rotation of the auger effects movement of the auger over the slow sand filter.

In another embodiment, the apparatus has means to rotate the auger and means to move the auger over the slow sand filter.

Yet another aspect of the present invention provides a method of removal of a schmutzdecke layer from a slow sand filter, comprising:

suspending an auger screw across the width of the slow sand filter and supported in the centre thereof, such that the auger is horizontal, said auger screw having a shroud located along the length of the auger and spaced therefrom, rotating the auger so as to move a portion of the layer of schmutzdecke towards the centre of the slow sand filter and simultaneously moving the auger and shroud radially across the slow sand filter, said auger moving in the direction away from the shroud, removing schmutzdecke from the centre of the slow sand filter.

In a preferred embodiment of the method of the present invention, the slow sand filter is located under water.

A still further aspect of the present invention provides a method of use of a slow sand filter system located under a body of water, said slow sand filter system having a predetermined maximum vertical flow rate for water through the filter, comprising:

passing water from said body of water through said slow sand filter system at a rate less than said maximum vertical flow rate, recycling a portion of said water passing through said slow sand filter system to said body of water and removing the remainder thereof to a location distant from the body of water.

In a preferred embodiment of the method of the present invention, recycled water is aerated, and optionally treated with ozone.

In a further embodiment, at least 60% of the water is recycled and especially at least 90% is recycled.

In another embodiment, the slow sand filter system is adapted for removal of a schmutzdecke layer by suspending an auger screw across the width of the slow sand filter and supported in the centre thereof, such that the auger is horizontal, said auger screw having a shroud located along the length of the auger and spaced therefrom, rotating the auger so as to move a portion of the layer of schmutzdecke towards the centre of the slow sand filter and simultaneously moving the auger and shroud radially across the slow sand filter, said auger moving in the direction away from the shroud, and removing schmutzdecke from the centre of the slow sand filter.

The present invention is illustrated by the embodiments shown in the drawings, in which:

FIG. 2A is a schematic representation of a cross-section of an auger of FIG. 2, through A—A;

Figure 1:
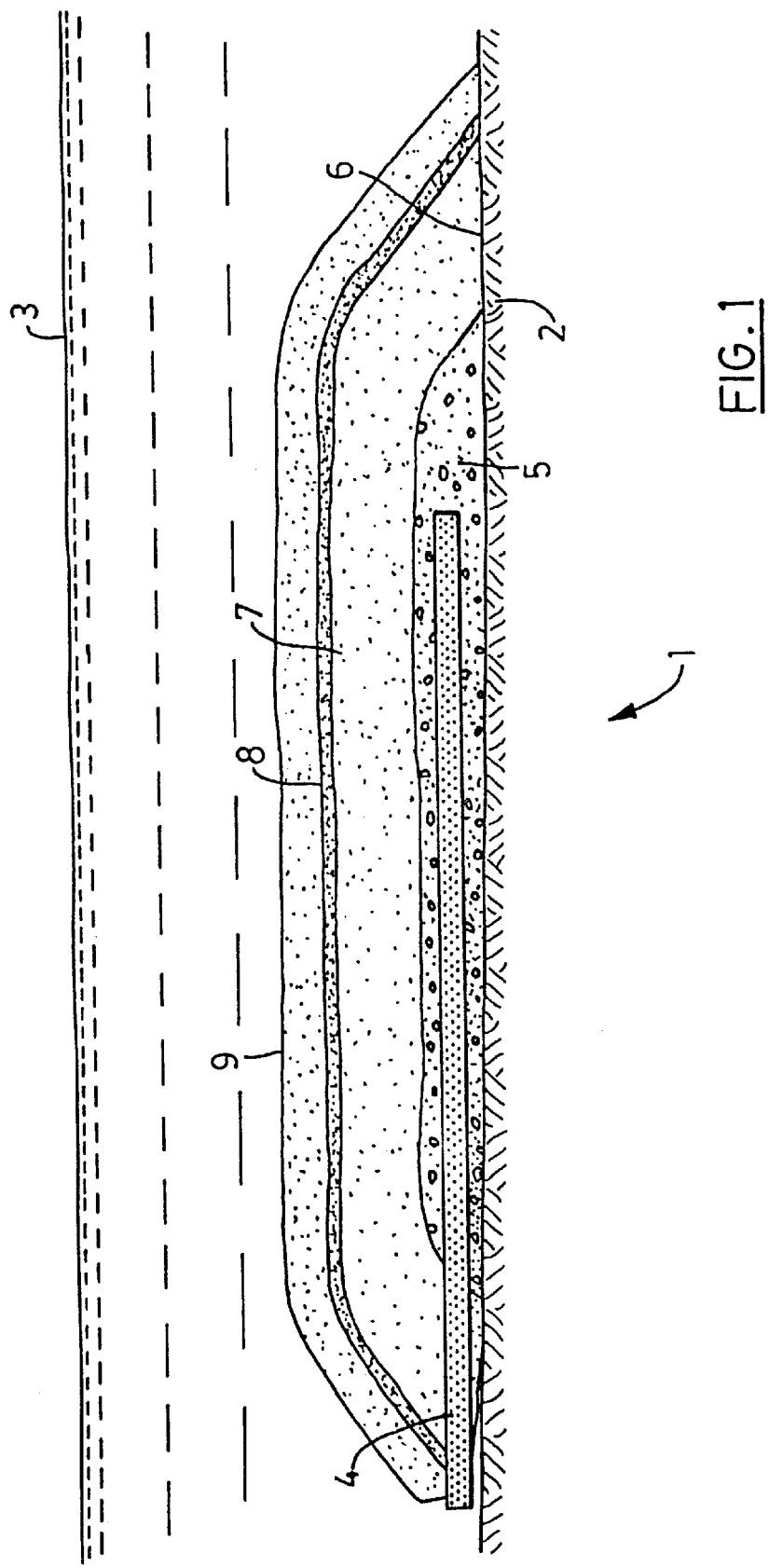
FIG. 1 is a schematic representation of a slow sand filter as installed in a lake.

FIG. 1 shows a slow sand filter 1 located on a bed 2 of a body of water 3 e.g. a lake. A perforated water inlet pipe 4 draws water down through slow sand filter 1, and conveys it to the municipal water supply system for chlorination and distribution, or to some other system utilizing the water. Perforated water inlet pipe 4 is located within a bed of gravel 5. In addition, bed of gravel 5 would normally be separated from bed 2 by a plastic liner, generally indicated by 6. A layer of sand 7 is located over bed of gravel 5 for essentially the full width of the slow sand filter 1. A layer of activated charcoal 8 is located on the bed of sand 7, and is in turn covered by top layer of sand 9. It is in top layer of sand 9 that the schmutzdecke is formed.

In operation, water is taken from a source, e.g. a lake or reservoir, downward through the slow sand filter to perforated inlet pipe 4, which would be in the form of a network of such pipes. Such water may be conveyed to a drinking water treatment plant for chlorination or other treatment, and then distributed, or used in some other manner. The water passes downwards through sand 9, activated charcoal 8 (if present), sand 7 and gravel bed 5, into perforated pipe 4. In doing so, particulate and other matter is removed in the upper layer of sand, 9, forming a layer of schmutzdecke on the outer (upper) surface of sand layer 9, and the major improvement in water quality occurs as the water passes through sand layer 9.

The present invention incorporates a slow sand filter, as exemplified in FIG. 1, as part thereof. However, it is to be understood that the actual construction of the slow sand filter may be varied, for instance by omission of the layer of activated charcoal, as the nature of the layering in the slow sand filter is not important to the present invention, other than the need for formation of a layer of schmutzdecke on the top thereof.

Figure 2:
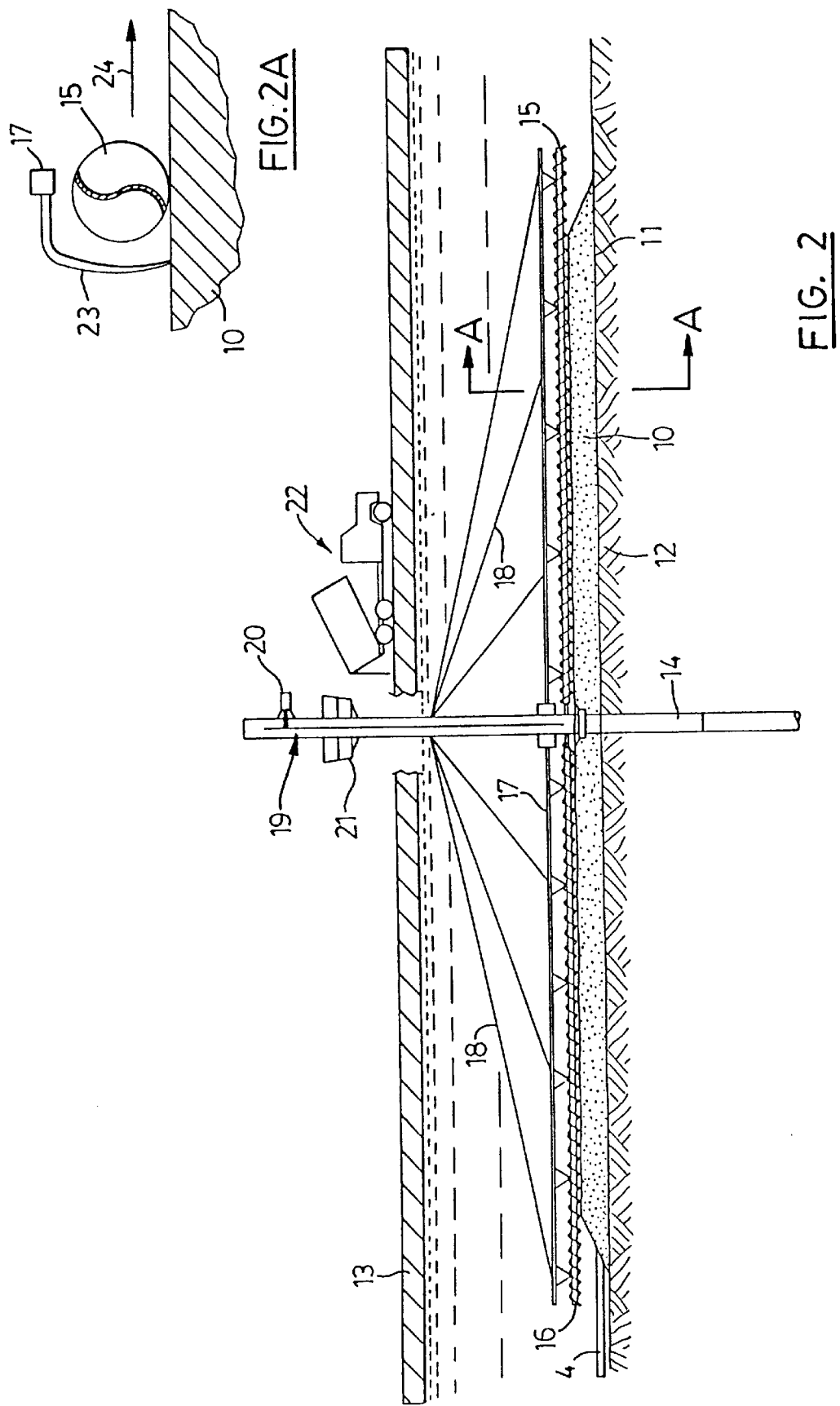
FIG. 2 is a schematic representation of apparatus of the present invention in a lake.

FIG. 2 shows a slow sand filter according to the present invention located in the bottom of a lake. A slow sand filter 10, for instance as described in FIG. 1, is located on liner 11 resting on lake bed 12. Slow sand filter 10 is located in a lake, as indicated by a layer of ice 13. It is, however, understood that the slow sand filter could be located in a lake that is not subjected to freezing temperatures, and hence formation of ice, in which event methods of use described herein utilizing the ice surface would need to be replaced by other methods, e.g. methods operated from a barge. Although the present invention is particularly described herein with reference to methods of removal of the layer of schmutzdecke under water, which is the preferred embodiment, removal could be effected by drainage of water from the slow sand filter and subsequent removal of the layer of schmutzdecke.

Shaft 14 extends from lake bed 12, through slow sand filter 10 and upwards through the layer of ice 13. Shaft 14 is centrally located within slow sand filter 10, for reasons apparent from operation of the apparatus. Augers 15 and 16 extend from each side of shaft 14 at the surface of the slow sand filter 10. Augers 15 and 16 are held in place by frame 17 and a plurality of guy wires 18. It is understood that in normal operation, augers 15 and 16 would be in an aligned relationship, for ease in providing rotation of the augers during use and overall balance of the apparatus, but other arrangements could be used. In addition, augers 15 and 16 are horizontal, as apparent from operation of the method and the need to have uniform removal of schmutzdecke from slow sand filter 10.

Screw drive shaft 19, for operation of the augers, passes down within shaft 14, and is driven by motor 20. It is understood that screw drive shaft 19 may be replaced with a hydraulic drive or other method for operation of the augers. An optional work platform 21 is also shown as being located on shaft 14.

FIG. 2A shows cross-section of auger 15 of FIG. 2. Auger 15 has shroud 23 located on the backside of auger 15 i.e. on the side of auger 15 opposed to the direction of movement of auger 15, as indicated by arrow 24. Shroud 23 is attached to frame 17. It is to be understood that shroud 23 is optional, or may be of shapes other than that shown.

In an embodiment of the apparatus of the invention, a hopper is provided at the junction of shaft 14 and the surface of slow sand filter 10, for purpose of accumulation of schmutzdecke, as discussed below, and for removal from the slow sand filter.

Truck 22 is shown as providing additional sand for the filter, either during construction, or for replenishment during operation. If the water was ice-free, or the ice was not capable of supporting a truck, then a barge or other means could be used for addition or replenishment of sand to the slow sand filter.

As an example of the dimensions of the apparatus, the slow sand filter may have a width of 100–150 feet, or more. Moreover, the slow sand filter would normally be located under several feet of water, typically at least 20 feet in a lake but it could be located at a depth of 100 feet or more. The slow sand filter does need to be covered with several feet of water for acceptable operation, but the depth is primarily governed by practical considerations. It should be further understood that the slow sand filter system of the invention may be located far from the shore of a lake, at a convenient location therein.

Figure 3:
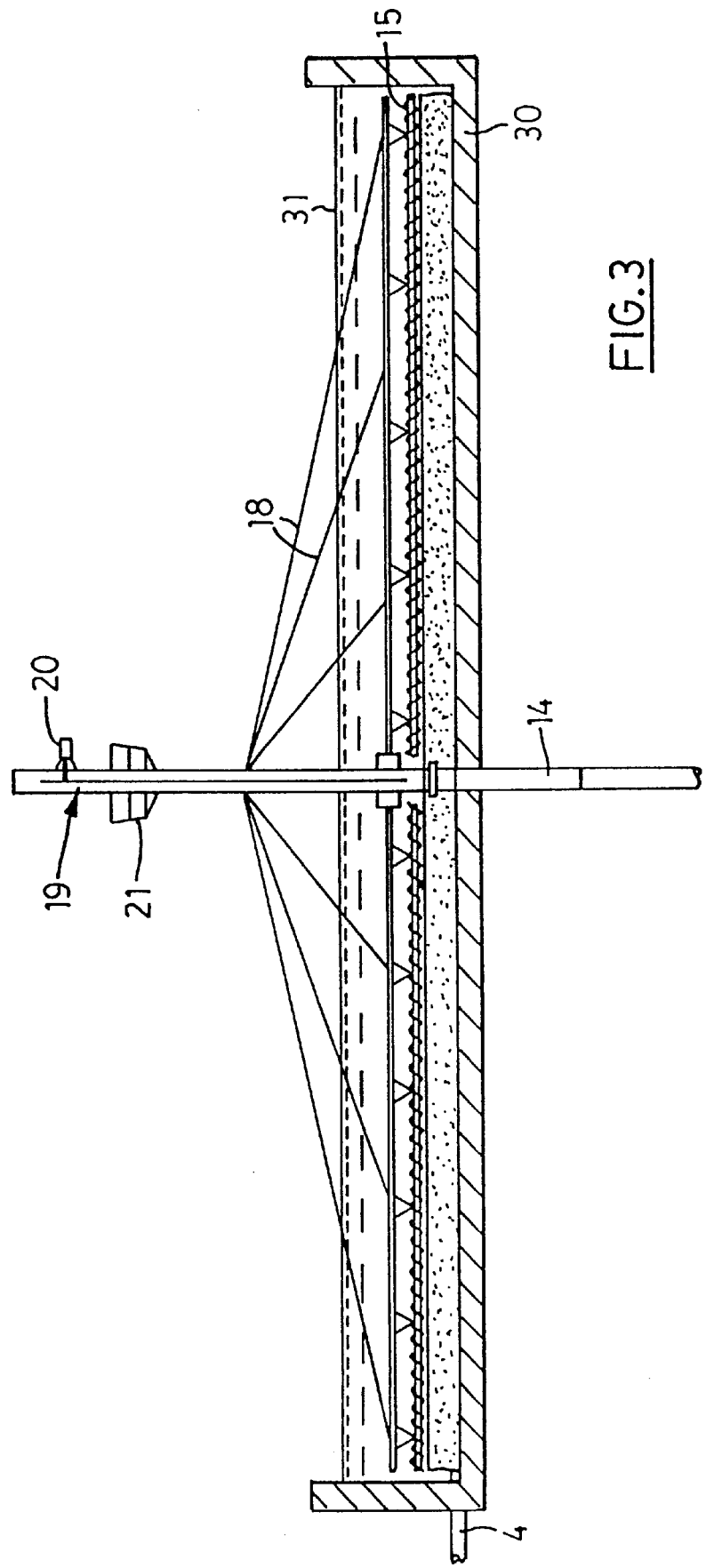
FIG. 3 is a schematic representation of alternate apparatus of the present invention, located in a containment.

FIG. 3 shows apparatus as described in FIG. 2, but located within containment 30, rather than on the bottom of a lake. This construction would be more likely to be used where a suitable lake was not available. In such an embodiment, the depth of water 31 above the slow sand filter is more likely to be several feet, rather than the greater depth that may readily be used in a lake.

Figure 4:
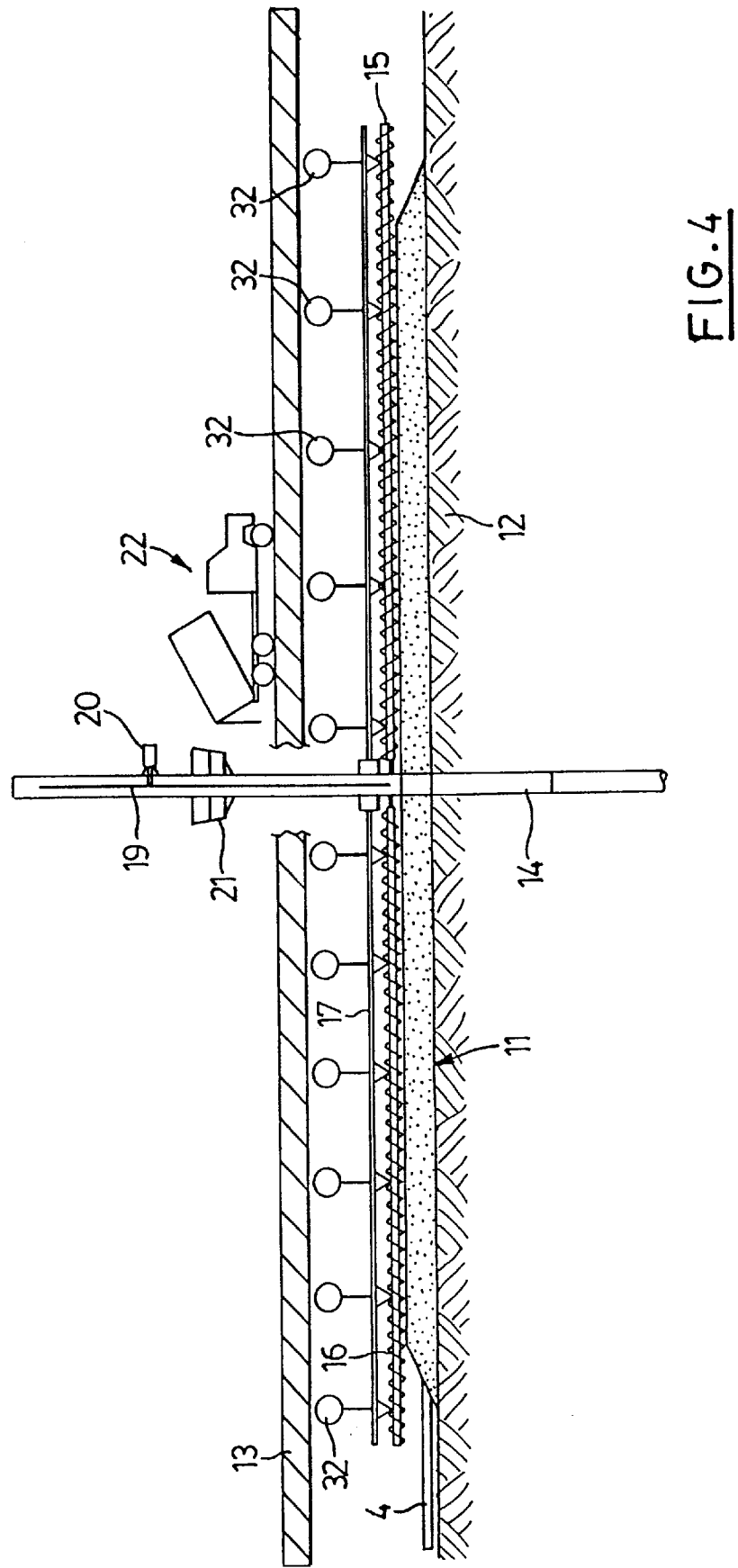
FIG. 4 is a schematic representation of apparatus of the present invention, utilizing alternate support means.

FIG. 4 shows apparatus as described in FIG. 2, but in which the guy wires used in support of the augers have been replaced with a plurality of floats 32. Such an embodiment might be preferred in some circumstances. One reason to prefer the use of floats is if the use of guy wires in support of the augers might be hampered by the formation of ice.

Figure 5:
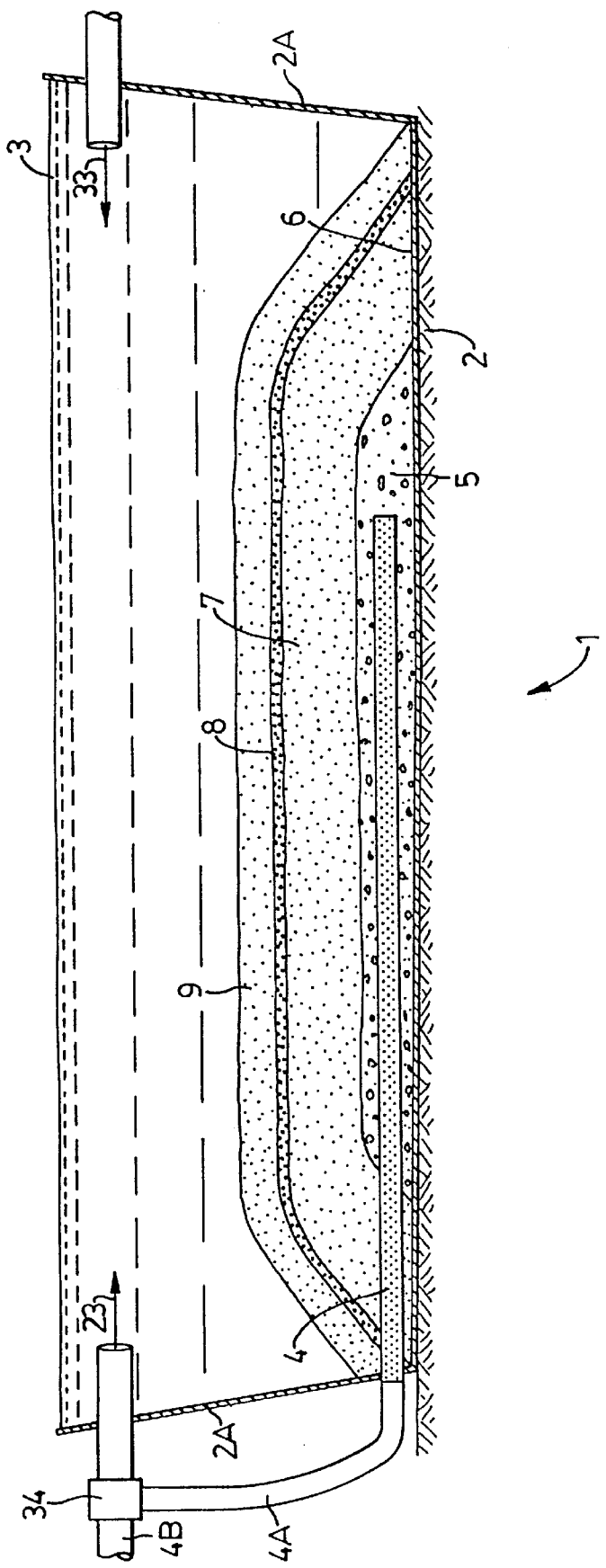
FIG. 5 is a schematic representation of a slow sand filter as installed in a pond.

FIG. 5 shows a slow sand filter 1 located on a bed 2 of a body of water 3 e.g. a pond, similar to FIG. 1 but shown as having banks 2A. A perforated water inlet pipe 4 draws water down through slow sand filter 1, and conveys it through pipe 4A to recycle valve 34, discussed below. A portion of the water is adapted to be conveyed to a municipal water supply system for chlorination and distribution, or to some other system utilizing the water, with a portion being recycled as discussed herein. Perforated water inlet pipe 4 is located within a bed of gravel 5; inlet pipe 4, which would normally be a network of interconnected pipes, receives water passing through the filter. In addition, bed of gravel 5 would normally be separated from bed 2 by a plastic liner, generally indicated by 6. A layer of sand 7 is located over bed of gravel 5 for essentially the full width of the slow sand filter 1; a filter cloth may be used to separate sand 7 and gravel 5 (not shown). A layer of activated charcoal 8, which is optional as discussed above, is shown as located on the bed of sand 7, and is in turn covered by top layer of sand 9. As discussed above, it is on top of layer of sand 9 that the schmutzdecke is formed.

Perforated water inlet pipe 4 is connected, through pipe 4A to recycle valve 34. Recycle valve 34 is connected to recycle pipe 23 in body of water 3. Water discharge pipe 4B is connected to a distant location (not shown) e.g. the municipal water supply system. It is understood that pipe 4A and/or recycle valve 34 may have a pump associated therewith. Water passing through pipe 4B would normally be subjected to chlorination, whereas water passing through pipe 23 would not be chlorinated.

However, as noted above, it is to be understood that the actual construction of the slow sand filter may be varied.

Figure 6:
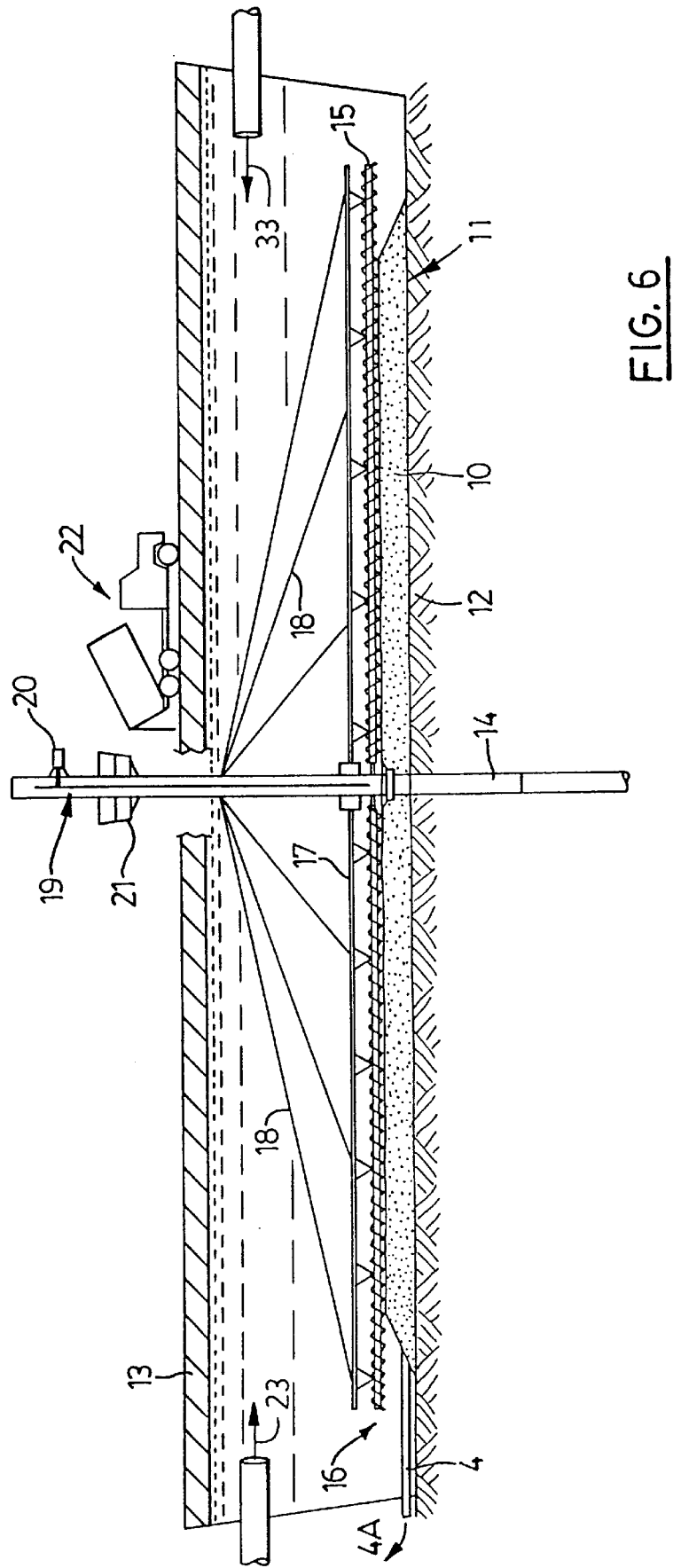
FIG. 6 is a schematic representation of apparatus of the present invention in a pond.

FIG. 6 shows a slow sand filter utilizing recycle according to the present invention located in the bottom of a pond, and especially an embodiment of apparatus for removal of schmutzdecke. A slow sand filter 10, for instance as described in FIG. 5, is located on liner 11 resting on pond bed 12. Slow sand filter 10 is located in a pond, as indicated by a layer of ice 13. It is, however, understood that the slow sand filter could be located in a pond that is not subjected to freezing temperatures, and hence formation of ice, in which event methods of use described herein utilizing the ice surface would need to be replaced by other methods, e.g methods operated from a barge.

Shaft 14 extends from pond bed 12, through slow sand filter 10 and upwards through the layer of ice 13. Shaft 14 is centrally located within slow sand filter 10, for reasons apparent from operation of the apparatus. In the embodiment, augers 15 and 16 extend from each side of shaft 14 at the surface of the slow sand filter 10. Augers 15 and 16 are held in place by frame 17 and a plurality of guy wires 18. It is understood that in normal operation, augers 15 and 16 would be in an aligned relationship, for ease in providing rotation of the augers during use and overall balance of the apparatus, but other arrangements could be used. In addition, augers 15 and 16 are horizontal, as apparent from operation of the method and the need to have uniform removal of schmutzdecke from slow sand filter 10.

Screw drive shaft 19, for operation of the augers, passes down within shaft 14, and is driven by motor 20. It is understood that screw drive shaft 19 may be replaced with a hydraulic drive or other method for operation of the augers. An optional work platform 21 is also shown as being located on shaft 14.

Recycle of water is provided, according to the present invention and especially as described with respect to the embodiment of FIG. 5.

In an embodiment of the apparatus for removal of schmutzdecke, a hopper is provided at the junction of shaft 14 and the surface of slow sand filter 10, for purpose of accumulation of schmutzdecke, as discussed herein, and for removal from the slow sand filter.

Truck 22 is shown as providing additional sand for the filter, either during construction, or for replenishment during operation. If the water was ice-free, or the ice was not capable of supporting a truck, then a barge or other means could be used for addition or replenishment of sand to the slow sand filter.

As an example of the dimensions of the apparatus, the slow sand filter may have a width of 100–150 feet, or more. Moreover, the slow sand filter would normally be located under several feet of water, typically at least 20 feet in a pond. The slow sand filter does need to be covered with several feet of water for acceptable operation, but the depth is primarily governed by practical considerations.

Figure 7:
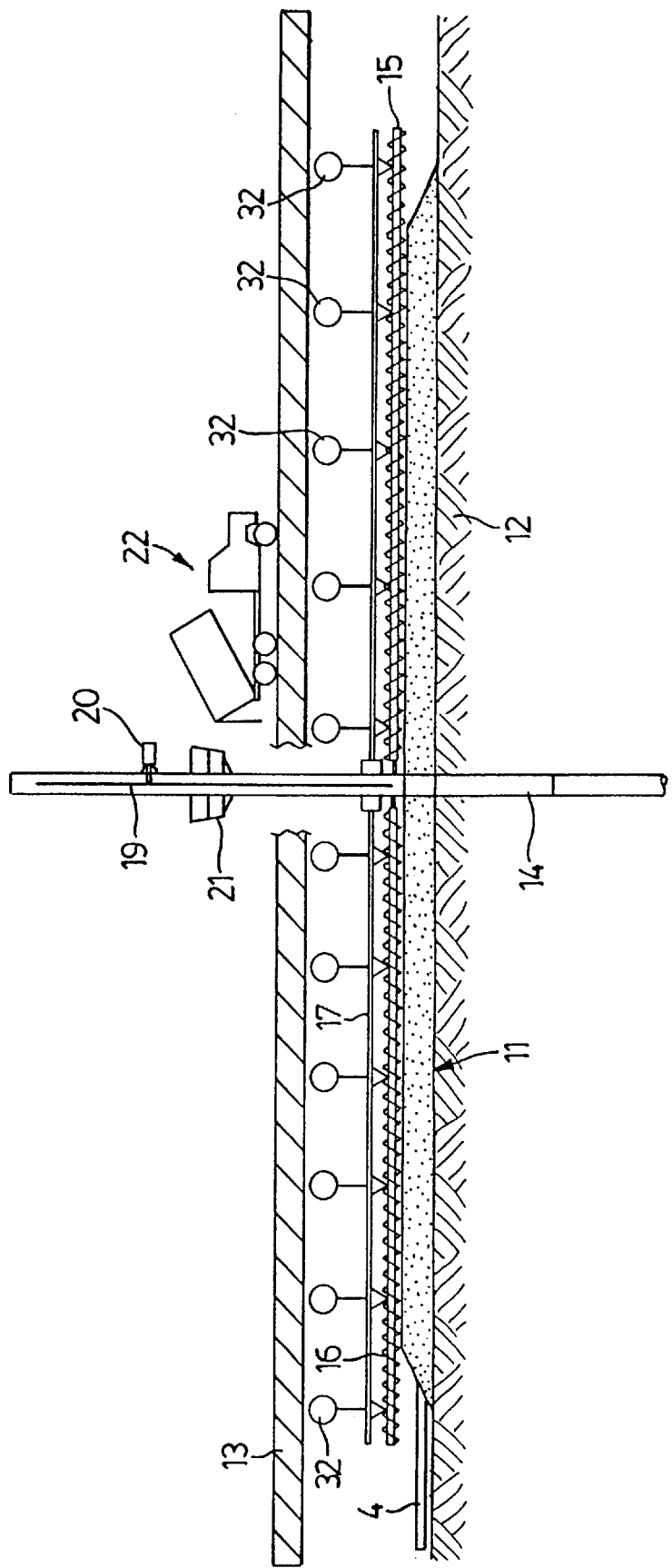
FIG. 7 is a schematic representation of apparatus of the present invention, utilizing alternate support means.

FIG. 7 shows apparatus as described in FIG. 2, but in which the guy wires used in support of the augers have been replaced with a plurality of floats 32. Such an embodiment might be preferred if the use of guy wires in support of the augers was hampered by the formation of ice. The edges (banks) of the pond and the recycle piping etc. described above are not shown in FIG. 7.

In operation with recycle, water is taken from a source, e.g. a pond or reservoir, downward through the slow sand filter to perforated inlet pipe 4, which would be a network of such pipes. Water passes from pipe 4 through pipe 4A to recycle valve 34. Recycle valve 34 passes a portion of the water to the body of water 3. The remainder of the water may be conveyed to a drinking water treatment plant for chlorination or other treatment, and then distributed, or used in some other manner. In the slow sand filter system, the water passes downwards through sand 9, activated charcoal 8 (if present), sand 7 and gravel bed 5, into perforated pipe 4. In doing so, particulate and other matter is removed in the upper layer of sand, 9, forming a layer of schmutzdecke on the outer (upper) surface of sand layer 9, and the major improvement in water quality occurs as the water passes through sand layer 9.

The apparatus for removal of schmutzdecke described herein may be permanently located on the slow sand filter. However, it is particularly intended that the apparatus would not be permanently located there, but would rather be used with many sand filters and hence would be brought to the location and assembled for removal of the schmutzdecke. For such removal, the augers are caused to rotate in a manner so as to remove the layer of schmutzdecke. Two alternate methods may be used. For instance, in a lake, the augers could be rotated so that the schmutzdecke is moved outwards from the outer edge of the slow sand filter and permitted to accumulate there. The alternate method is to rotate the augers so that the schmutzdecke is moved towards the centre, to the hopper described above, from where it is removed as a slurry, e.g. by pumping through a floating line (not shown) to the shore if the slow sand filter is in a lake that is not frozen, a truck if the lake is frozen or to a vessel conveniently located near the slow sand filter and transported to shore. In the pond, the augers are rotated so that the schmutzdecke is moved towards the centre, to the hopper described above, from where it is removed as a slurry, e.g. by pumping through a floating line (not shown) to the shore if the slow sand filter is in a pond that is not frozen, a truck if the pond is frozen or to a vessel conveniently located near the slow sand filter and transported to shore.

As the augers rotate, the natural motion of rotation of the augers will tend to cause the augers to also rotate with respect to shaft 14. Thus, the augers will move over the entire surface of the slow sand filter, removing the schmutzdecke therefrom. If necessary, additional rotational motion may be applied to assist the augers in rotation about shaft 14.

It is understood that the augers should be oriented horizontally so that rotation of the augers about shaft 14 will result in the removal of a uniform layer of schmutzdecke from the slow sand filter.

The present invention has been particularly described herein with reference to the use of two augers. However, it is to be understood that other than two augers may be used e.g. four augers.

The removal of schmutzdecke invention has been particularly described with respect to an auger or screw to convey the schmutzdecke across the filter, in which the auger or screw is suspended from a frame that pivots about the centre and spans the entire sand filter system. There are, however, other mechanisms that can be suspended from such a frame to accomplish the same objective. For instance, rotating scraper paddles could be used, in which baffles or the like located at an angle to the rotating frame would move the schmutzdecke across the surface of the filter. Alternatively, the rotating frame could have angled water jets thereon to move the schmutzdecke. Furthermore, the rotating frame could have thereon a mechanism for cleaning the sand in place e.g. using a rototiller to agitate the sand surface and a suction pipe or generated water current to remove dirty water, including particulate, from near the surface of the sand layer. The latter use, in particular, may require the use of a shroud that more fully encloses the auger. It is to be understood that a variety of shapes of shroud may be used, depending on the particular method of operation.

The scraping operation is independent of the sides of any containment for the slow sand filter, or the edge of the slow sand filter if there is no containment, and also independent of the depth of water over the slow sand filter, because the level, height and support of the scraping mechanism is provided at the centre of the filter and the bottom of the containment. Thus the height and level of the scraping mechanism may be adjusted as required to effect removal of a predetermined amount of schmutzdecke. The ability to adjust the height and level results in the ability to construct and maintain a slow sand filter in an existing pond, whether a man-made pond or a natural pond, and to bring a scraping mechanism to the slow sand filter system as required for installation in a desired position. In cold climates, for instance most regions of Canada, where it is necessary to cover slow sand filters in order to prevent ice forming in the filter basins, the slow sand filter can be located at a sufficient depth to avoid such an ice problem, and operated and scraped as required at any season without any need to drain the water.

In the design of slow sand filters, the downward velocity of flow through the filter is a compromise between cost of construction and cost of maintenance. Small filters with high velocities have low construction costs and high maintenance costs due to the need to frequently scrape the schmutzdecke off of the filter. Conversely, large filters with low velocities tend to have high construction costs and low maintenance costs due to less frequent scraping. Costs of construction of the slow sand filter system as described herein will be reduced because of the ability to use natural surroundings i.e. the bottom of a pond. Moreover, the scraping mechanism is portable, and may be used while the slow sand filter is still in operation, thereby reducing maintenance costs. This makes the construction of a large slow sand filter system more attractive.

In preferred embodiments of the method, a current of water flows over the slow sand filter during scraping, to remove sand and debris stirred up during the scraping operation and prevent it re-settling down onto the surface of the slow sand filter. In a lake this could be accomplished using an outboard motor on a boat.

The sources of water for the slow sand filter system of the present invention would normally be a natural lake, river, stream, spring or well water. The primary purpose of slow sand filtration is generally to provide drinking water. This system may however have application in treating industrial or municipal waste water with the intent to remove contaminants before discharge to the environment. In a wastewater application, the filter system would be located in a constructed lagoon or pond with discharge after filtration to a lake or river.

A large slow sand filter as described herein may operated at a low velocity of water through the filter with water that contains high levels of algae, and still be cleaned at infrequent intervals e.g. annually. Use of slow sand filters with water containing algae is normally not recommended without some pretreatment. However, in the present invention, because the large slow sand filter may be operated at a low velocity of water passing through the filter, it is possible to reduce the vertical downward velocity of the water to only a fraction of the maximum vertical flow rate capacity for operation of the slow sand filter system. For instance, the vertical downward velocity may be reduced to 40% of the maximum rate, and especially less than 15% of the maximum.

Nonetheless, according to the present invention, it is possible to operate the large slow sand filter at a higher velocity of water passing through the filter, at values closer to the rated of capacity for the slow sand filter, and to utilize recycling of the water passing through the filter. Such a method of operation permits additional treatment of the water to effect additional purification.

The use of the recycle system has a number of advantages. For instance, if there is too much oxygen demand (biodegradable material) in the raw water and the water passes through the filter at a slow rate, because the vertical velocity is slow, then the water will tend to become depleted of all of its oxygen resulting in undesirable anaerobic conditions. However, if recycling is used, the vertical velocity of water passing through the filter may be increased e.g. by at least 5 and especially at least 10 times the vertical flow rate. The result is that the flow of water passing from the slow sand filter system is increased by at least 5 times or at least 10 times, as the case may be, and the additional water not required by the municipality or other location is recycled back into the pond.

With respect to oxygen depletion in the filter, the use of the increased vertical flow, and consequently the recycle of water, decreases the time it takes for the water to pass through the filter to 20% or 10%, as the case may be, of that previously. The consequence is less oxygen depletion in the water passing through the filter. It is preferred that the water being recycled be re-oxygenated before it is refiltered. This may be achieved by agitation, if required, or by use of a natural oxygenation in the pond. While less biodegradable material is consumed in each pass through the filter systems, the use of the recycling of the water, and the consequent additional passes of the water through the slow sand filter system, results in removal of the biodegradable material.

Some organic material is made up of large organic molecules that are not readily biodegradable on a slow sand filter. Such molecules tend to cause colour, taste and/or odour problems. In addition trihalomethanes, which are carcinogenic, may be formed from organic material on chlorination of the water. Such organic material may be broken down by use of a pre-ozonation step, or use of other oxidizing agents e.g. hydrogen peroxide or potassium permanganate, that converts the material to more biodegradable molecules. The amount of such organic molecules in the water, including in the recycled water, could be monitored, and the amount of ozone required to achieve the required level of treatment adjusted accordingly. In addition, the use of the ozone may convert some non-biodegradable organic molecules to biodegradable molecules, which would be removed in the schmutzdecke of the filter. The effect may be a more efficient use of ozone added to the water.

The use of the recycle system has many advantages in the management of the demand for water. The pond above the filter, acts as a treated water storage zone. Slow sand filters, as is the case with most water treatment plants, are designed to provide water at the rate of the average daily demand on the system. However, there are times in the day when demand may be substantially greater than the daily average. Traditionally, treated water storage facilities are used to supply water during periods of high demand so that the treatment plant does not have to be operated at a different flow rate. However, according to the present invention, if for instance 90% recycled water is used, the flow of water coming from the filter does so at 10 times the daily average demand flow rate. In times when the demand for water is low, including zero demand, the recycling of the water could be up to 100% of the water passing through the filter. This has important consequences as the micro-organisms within the filter prefer to have constant conditions i.e. the micro-organisms tend to react adversely to frequent increases and decreases of water flow rate through the filter Depending on the demand for water, the process may be operated with 0–100% recycle of water. This provides significant flexibility in operation of the process, without altering the water flow rate through the filter.

I claim:

1. A slow sand filter system comprising:
   a slow sand filter located under water and having a shaft extending upwards from a central location thereof,
   a scraping mechanism comprising at least one auger located on said shaft, said auger extending across the width of the slow sand filter and being supported by said shaft such that the auger is horizontal, said auger having a shroud located along the length of the auger and spaced therefrom, and
   means to rotate the auger so as to move a portion of a schmutzdecke layer across the slow sand filter.

2. The slow sand filter system of claim 1 in which the scraping mechanism is portable, being movable from a first slow sand filter to a second slow sand filter.

3. The slow sand filter system of claim 2 in which the auger is adapted to move schmutzdecke towards said shaft, said scraping mechanism additionally having means to remove schmutzdecke from the centre of the slow sand filter.

4. The slow sand filter system of claim 2 in which the auger is adapted to move schmutzdecke away from the shaft.

5. The slow sand filter system of claim 2 in which the auger is suspended above the slow sand filter, in contact with the schmutzdecke.

6. The slow sand filter system of claim 2 in which there are two augers in an aligned relationship on opposed sides of the shaft.

7. The slow sand filter system claim 1 in which there is recycle means adapted to recycle at least 60% by volume of water passed through the slow sand filter.

8. The slow sand filter system of claim 1 in which there is recycle means adapted to recycle at least 90% by volume of said water.

9. The slow sand filter system of claim 7 in which said sand is located in a natural or artificial pond.

10. The slow sand filter system of claim 7 adapted for ozonation of said water.

11. A method of removal of a schmutzdecke layer from a slow sand filter located under water having a shaft extending upwards from a central location thereof, comprising:
    suspending a scraping mechanism including an auger across the width of the slow sand filter and supported by said shaft, such that the auger is horizontal, said auger screw having a shroud located along the length of the auger and spaced therefrom,
    rotating the auger so as to move a portion of the layer of schmutzdecke across the slow sand filter and simultaneously moving the auger and shroud radially across the slow sand filter, said auger moving in the direction away from the shroud, and
    removing schmutzdecke from the slow sand filter.

12. The method of claim 11 in which the auger is adapted to move schmutzdecke towards said shaft, said scraping mechanism additionally having means to remove schmutzdecke from the centre of the slow sand filter.

13. The method of claim 11 in which the auger is adapted to move schmutzdecke away from the shaft.

14. The method of claim 11 in which the water is water in a lake, pond, stream or river.

15. The method of claim 11 in which the water is industrial waste water.

16. The method of claim 11 in which there are means to rotate the auger and means to move the auger over the slow sand filter.

17. The method of claim 11 in which there are two augers in an aligned relationship on opposed sides of the shaft.

18. The method of claim 11 in which the water has a layer of ice thereon.

19. The method of claim 11 in which there is the additional step of removing said auger from the shaft.

20. A method of use of a slow sand filter system located under a body of water, said slow sand filter system having a predetermined maximum vertical flow rate for water through the filter, comprising:
    passing water from said body of water through said slow sand filter system at a rate less than said maximum vertical flow rate, aerating and recycling a portion of said water passing through said slow sand filter system to said body of water and removing the remainder thereof to a location distant from the body of water.

21. The method of claim 20 in which the recycled water is aerated by treating with ozone.

22. The method of claim 20 in which the recycled water is treated with an oxidizing agent.

23. The method of claim 20 in which at least 60% by volume of the water passing through the slow sand filter system is recycled.

24. The method of claim 23 in which at least 90% by volume of the water is recycled.

25. The method of claim 20 in which the slow sand filter system is adapted for removal of a schmutzdecke layer by suspending an auger screw across the width of the slow sand filter and supported on a shaft in the centre thereof, such that the auger is horizontal, said auger screw having a shroud located along the length of the auger and spaced therefrom, rotating the auger so as to move a portion of the layer of schmutzdecke towards the centre of the slow sand filter and simultaneously moving the auger and shroud radially across the slow sand filter, said auger moving in the direction away from the shroud, and removing schmutzdecke from the centre of the slow sand filter.

26. The method of claim 20 in which the water is water in a natural or artificial pond.

27. The method of claim 26 in which the water is industrial waste water.

* * * * *